United States Patent
Urbahn et al.

(10) Patent No.: US 7,485,219 B2
(45) Date of Patent: Feb. 3, 2009

(54) FUEL MODULE

(75) Inventors: Arndt Urbahn, Ludwigsburg (DE); Dieter Schreckenberger, Marbach (DE); Dieter Amesoeder, Bietigheim-Bissingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 577 days.

(21) Appl. No.: 11/129,389

(22) Filed: May 16, 2005

(65) Prior Publication Data

US 2005/0252847 A1  Nov. 17, 2005

(30) Foreign Application Priority Data

May 14, 2004  (DE) .................. 10 2004 024 466

(51) Int. Cl.
*F02M 37/22* (2006.01)
(52) U.S. Cl. ............... 210/167.01; 210/184; 210/172.2; 210/416.4; 210/436
(58) Field of Classification Search .............. 210/184, 210/416.4, 167.01, 172.2, 436
See application file for complete search history.

(56) References Cited

U.S. PATENT DOCUMENTS 4,704,070 A  11/1987 Iseman
6,802,210 B2 *  10/2004 Mitani et al. ............... 73/118.1

FOREIGN PATENT DOCUMENTS

| DE | 3325772 A | * | 1/1985 |
| DE | 19538883 A1 | * | 4/1997 |
| DE | 19960600 A1 | * | 6/2001 |
| EP | 412210 A | * | 2/1991 |
| EP | 0 579 540 B1 | | 9/1996 |
| WO | WO 9614506 A1 | * | 5/1996 |
| WO | WO 0133069 A | * | 5/2001 |

* cited by examiner

*Primary Examiner*—Terry K Cecil
(74) *Attorney, Agent, or Firm*—Crowell & Moring LLP

(57) ABSTRACT

A fuel module, especially for the diesel fuel of an auto-ignition engine, having a fuel tank (10) and a fuel filter (11). The fuel tank (10) has a wall (12), which encloses the volume of the fuel tank (10), and the wall (12) has an opening in the region of the fuel filter (11). The fuel filter (11) is sealed to the wall (12) in the region of the opening and contains a filter medium (26), which is suitable for separating water from the fuel, which is to be cleaned. Also disposed within the fuel filter (11) is a water storage unit (38) in which water separated from the fuel is collected.

7 Claims, 6 Drawing Sheets

FUEL MODULE

CROSS REFERENCE TO RELATED APPLICATION

This application claims priority from Federal Republic of Germany patent application no. DE 102004 024 466.9, filed May 14, 2004, the entire disclosure of which is incorporated herein by reference.

BACKGROUND OF THE INVENTION

The present invention relates to a fuel module comprising a fuel tank and a fuel filter, in which the fuel tank comprises a wall which encloses the volume of the fuel tank, the wall has an opening in the area of the fuel filter, and the fuel filter is sealed to the wall in the vicinity of the opening. The fuel module of the invention is especially suitable for filtering and supplying diesel fuel to an auto-ignition engine, i.e. diesel engine.

SUMMARY OF THE INVENTION

It is an object of the present invention to provide an improved fuel module which comprises a fuel tank and a fuel filter.

Another object of the invention is to provide a fuel module which is especially suitable for diesel fuel for an auto-ignition engine.

These and other objects have been achieved in accordance with the present invention by providing a fuel module comprising a fuel tank and a fuel filter, the fuel tank having a wall which encloses the volume of the fuel tank, the wall having an opening in the area of the fuel filter, and the fuel filter being sealed to the wall in the vicinity of the opening, wherein the fuel filter comprises a filter medium which separates water from fuel passed through the filter, and wherein the fuel filter further comprises a water storage unit disposed within the fuel filter for receiving water separated from the fuel.

In accordance with a preferred embodiment of the invention, the fuel filter is connected by a bayonet lock with the fuel tank, and a seal is disposed in the bayonet lock in order to seal the arrangement.

In accordance with another preferred embodiment of the invention, a sensor, which can detect the degree to which the fuel tank is filled, is disposed in the fuel tank.

In yet another preferred embodiment, the fuel filter is provided with a water sensor which can detect the degree to which the water storage unit is filled.

In another preferred embodiment, a water suction pipe is provided, which is connected at one end with the water storage unit and at the other end to a water outlet through which collected water can be discharged outside of the fuel tank.

In a further preferred embodiments of the invention, the fuel filter has a support disposed on the fuel tank opposite the opening and/or the fuel filter includes a degassing device and/or the fuel filter is provided with a pre-heating unit for the fuel.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
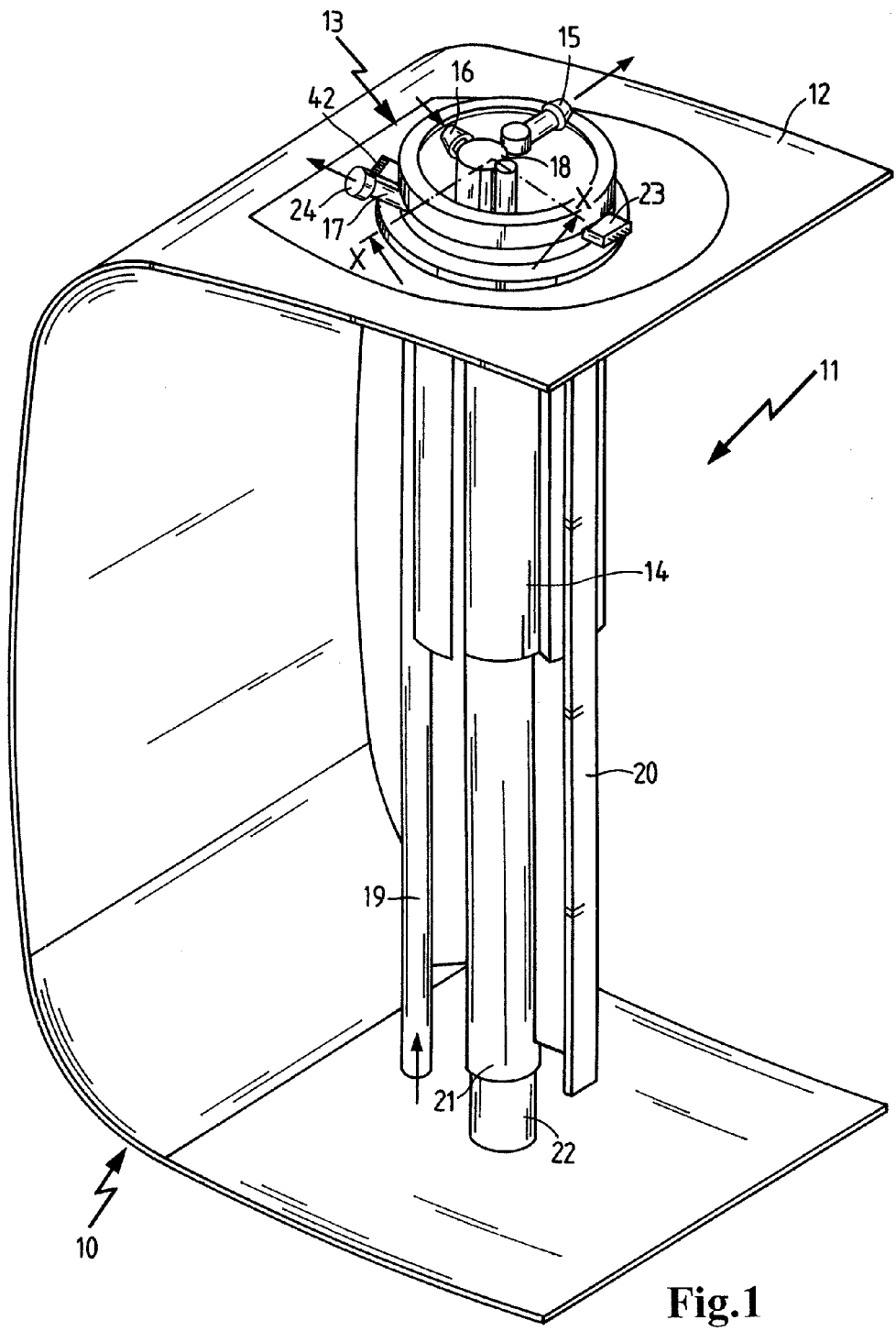
FIG. 1 is a diagrammatic view of a sector of a fuel module according to the invention.

In FIG. 1, a sector of a fuel module is shown. The fuel module comprises a fuel tank 10 and a fuel filter 11. The fuel tank 10 is constructed as a closed component, enclosing a volume, only a portion being shown. The capacity of the fuel tank 10 is designed so that an auto-ignition engine has a defined operating time at its disposal.

The auto-ignition engine may be disposed, for example, in a motor vehicle, the motor vehicle having a particular operating range. The motor vehicle, in which the fuel module is disposed, may, for example, be a truck, construction machinery or an agricultural machine. Of course, the fuel module of the invention can also be used in other motor vehicles. The larger the capacity, the greater is the operating range of the motor vehicle and the longer is the operating period the auto-ignition engine.

The fuel tank 10 has a wall 12, which may be comprised of metal or synthetic resin material, i.e. plastic. This wall 12 limits the capacity of the fuel tank 10, which may have any shape. Preferably, the fuel tank 10 is constructed as a rectangular block or cylinder.

The fuel filter 11 comprises a filter head 13 and a filter housing 14. The fuel filter 11 is sealed to the wall 12 of the fuel tank 10, the filter head 13 being outside and the filter housing 14 inside the fuel tank 10. The filter head 13 includes a fuel outlet 15, a fuel return pipeline 16 and a water outlet 17. The fuel outlet 15 is connected correspondingly with an internal combustion engine (see FIG. 6), so that purified fuel can be transported from the tank to the auto-ignition engine.

The fuel return pipeline 16 is also correspondingly connected with the auto-ignition engine and passes excess fuel or returning fuel from the auto-ignition engine back to the fuel filter 11. The returning fuel is passed on to a pre-heater unit 18, the fuel, which is to be cleaned, being mixed with the returning fuel in a manner depending on the fuel temperature and especially on the fuel temperature existing in the fuel tank 10. Accordingly, blockage of the fuel filter 11 is prevented.

The fuel filter 11 has a fuel-intake pipeline 19, which is constructed as a pipeline open at the front faces. Preferably, the fuel-intake pipeline 19 extends into the deepest place in the fuel tank 10, so that the fuel is drawn in in a reliable manner even if the height of the fuel in the fuel tank 10 is slight.

The fuel level can be detected with a sensor 20, which is equipped, in particular, as a sensor tape with a plurality of measuring sites. For this purpose, the sensor 20 protrudes throughout the fuel tank 10, so that a maximum and a minimum fuel level, as well as intermediate level can be detected. The sensor has a male connector 23, which can be connected with evaluating electronics (not shown), so that the level of fuel can be displayed on an output instrument (not shown).

In order to prevent vibrations of the fuel filter 11 during the operation of the auto-ignition engine, the fuel filter is supported with a supporting dome 21 at a corresponding seat 22 at the fuel tank 10. The supporting dome 21 and the seat 22 are disposed perpendicularly underneath the filter head 13. Accordingly, the fuel filter is fixed, on the one hand, at the filter head 13 and, on the other, at the supporting dome 21.

The water outlet 17 is sealed with a screw cap 24. When water is to be withdrawn from the fuel filter 11, the screw cap 24 is removed and a corresponding suction unit (not shown) is connected.

Figure 2:
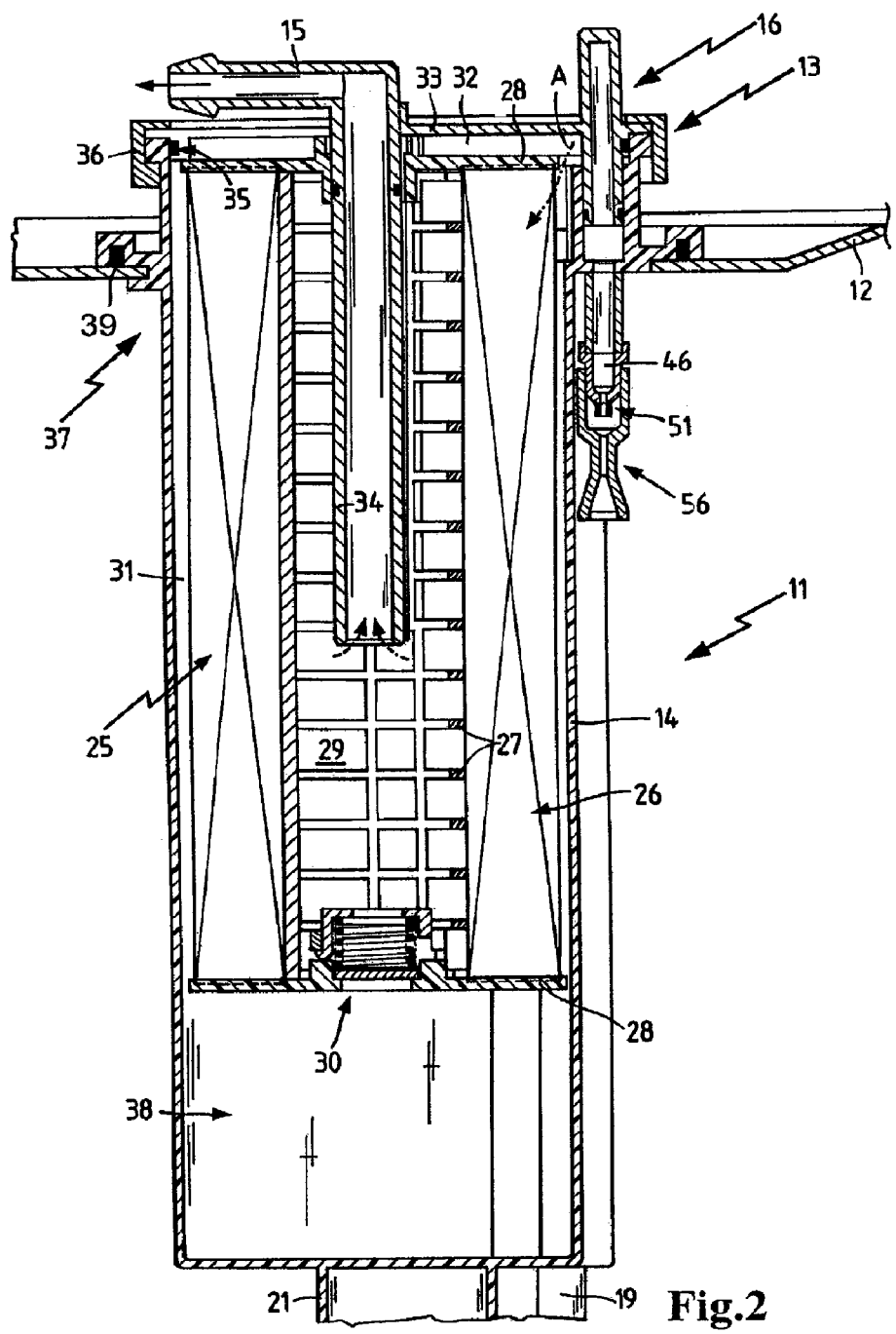
FIG. 2 is a sectional view of a fuel filter for a fuel module according to the invention.

FIG. 2 shows the fuel filter of FIG. 1 in section. Components, corresponding to those of FIG. 1, are identified by the same reference numerals. The fuel filter 11 comprises a filter element 25, which in turn comprises a filter medium 26, a supporting tube 27 and end discs 28. The filter medium 26 is sealed to the end discs 28 so that a hollow, cylindrical, internal space 29 is formed.

The supporting tube 27, which prevents collapse of the filter medium 26, is disposed in the internal space 29, which forms the clean or filtered liquid side of the filter. The filter medium 26 is constructed so that water is separated from the fuel. For this purpose, media, known from the art, may be used. Furthermore, the filter element has a bypass valve 30, which releases the flow path when the pressure difference is excessive.

An unfiltered liquid side 13, which is connected via an intermediate space 32 with the fuel intake pipeline 19, is formed between the filter element 25 and the filter housing 14. The intermediate space 32 is formed between the upper end disc 28 and a cover 33. The flow path for the fuel which is to be cleaned is indicated by arrow A.

The filter element 25 is sealed to the fuel pipe 34, the fuel pipe being connected with the fuel outlet 15. In this embodiment, the cover 33, the fuel pipe 34 and the fuel outlet 15 are constructed in one piece. The cover 33 has a sealing ledge 35, which contacts the filter housing 14 to form a seal.

A bayonet ring 36 is provided so that the cover 33 does not become loose in an uncontrolled manner during the operation of the fuel module. This bayonet ring 36 connects the cover 33 securely with the filter housing 14. Furthermore, for changing the filter element 25, the cover 33 can be detached easily from the filter housing 14. Furthermore, the filter housing 14 has a bayonet lock 37, with which the filter housing 14 can be sealed to the wall 12 of the fuel tank 10. The seal-forming connection is produced over an axially compressed seal 39.

A water storage device 38 for collecting the water separated from the fuel, is disposed in the filter housing 14. Accordingly, the separated water is not mixed with the fuel remaining in the fuel tank 10. The size of the water storage unit 38 is such, that a defined amount of water can be accommodated and the emptying of the war to storage unit 28 can take place after longer time intervals.

The fuel, which is to be cleaned, is passed through the fuel intake pipeline 19 from the fuel tank 10 into the intermediate space 32. This can be accomplished by a suction pump (not shown) downstream, in the flow direction, from the fuel filter or by an upstream pressure pump (not shown). From the intermediate space 32, the fuel flows, as indicated by arrow A, to the crude side 31 and through the filter element 25. On the clean side 29, the clean fuel enters the fuel pipeline 34 and flows through the fuel outlet 15 from the fuel filter 11. If the pressure difference between the crude side 31 and the clean sides 29 is excessive, the bypass valve 30 opens up so that fuel, which has not been purified, reaches the clean side 29.

Figure 3:
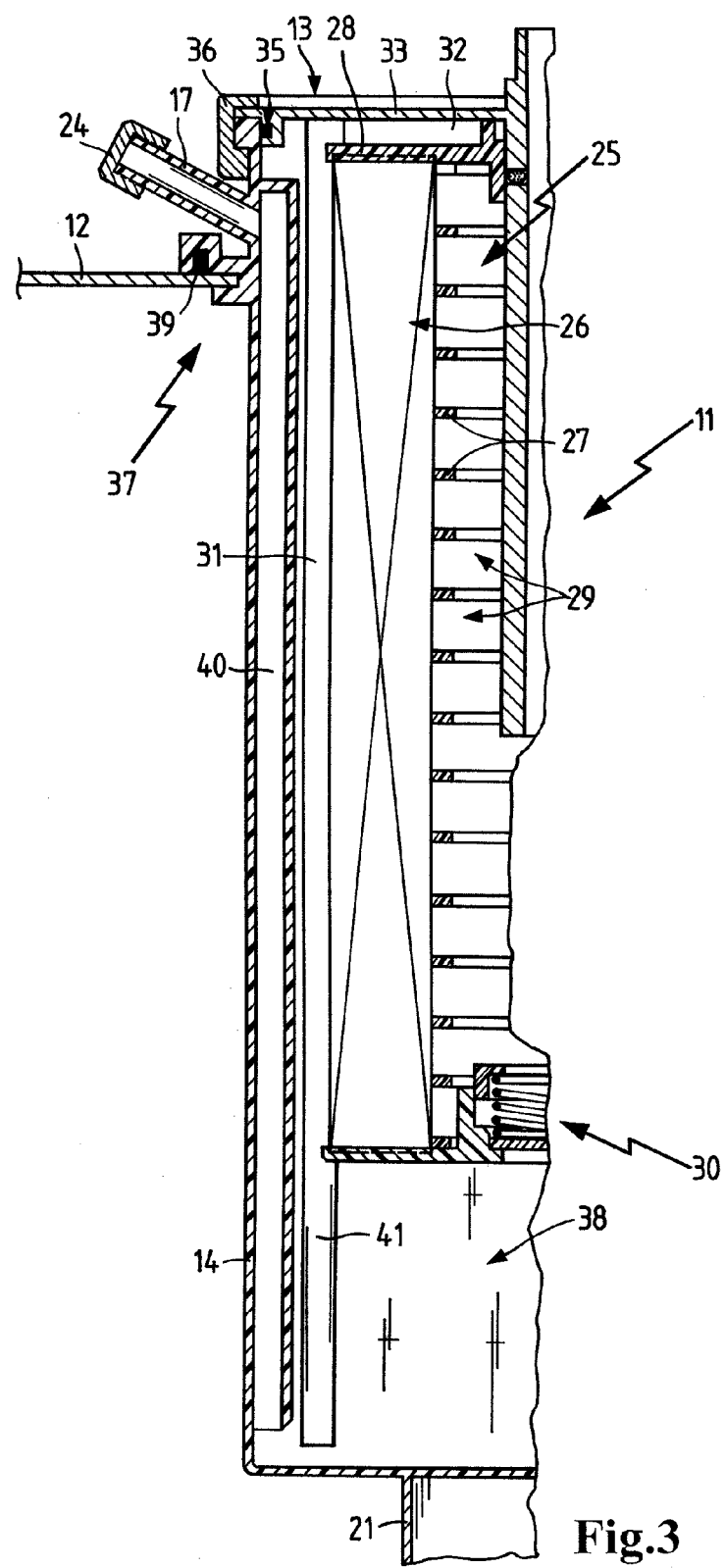
FIG. 3 is a sectional view of a sector of the fuel module of FIG. 1.

In FIG. 3, a sector from the fuel module, especially from the fuel filter 11 of FIG. 1, is shown in section. Components which correspond to those in FIGS. 1 and 2 are identified by the same reference numerals. A water suction pipe 40 is disposed in the fuel filter 11, the water suction pipe 40 being connected, on the one hand, with the water storage unit 38 and, on the other, with the water outlet 17. The water suction pipe 40 is constructed in one piece with the filter housing 14, the outer wall of the filter housing 14 forming part of the water suction pipe 40.

In the lowest region of the water storage unit 38, the water suction pipe 40 is opened, so that almost the whole of the water can be exhausted from the water storage unit 38. Preferably, the filter housing is made from synthetic resin material, so that the water suction pipe 40 can be produced in one step with the filter housing 14.

A water sensor 41, which extends through the whole of the filter housing 14, is disposed in the filter housing 14. In advantageous embodiments, the water sensor 41 can be constructed so that it can differentiate between different liquids, especially between fuel and water. Consequently, the phase boundary between fuel and water can be recognized, and the need to exhaust water from the water storage unit 38 can be indicated in good time. The water sensor can be connected via a connection 42 (of FIG. 1) to an appropriate evaluating unit (not shown).

Figure 4:
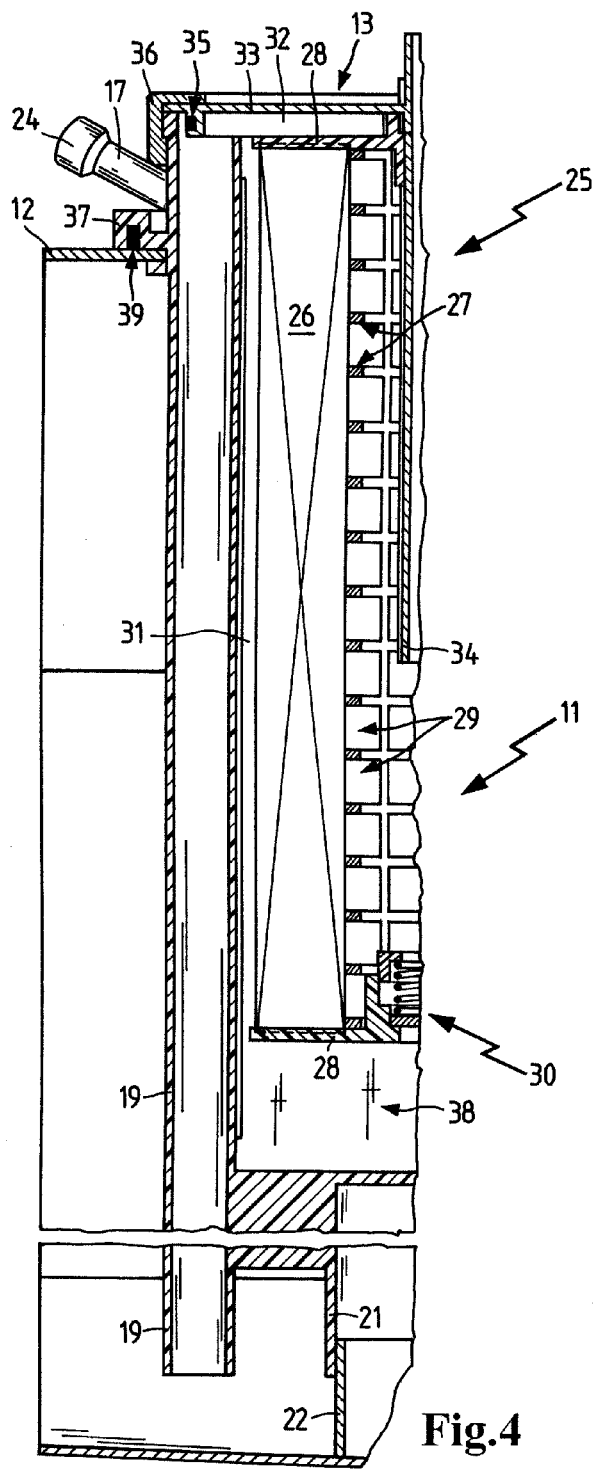
FIG. 4 is a sectional view of a further sector of the fuel module of FIG. 1.

In FIG. 4, a further sector from the fuel module of FIG. 1 is shown in a sectional view. Components corresponding to those in FIGS. 1 to 3 are identified by the same reference numerals. For this sector, the fuel intake pipeline 19 is shown in section. Furthermore, the supporting dome 21 and the seat 22 are shown in section. The supporting dome is slipped onto the seat 22, axial tolerances being equalized. The supporting dome 21 and the seat 22 are constructed as hollow components, particularly as pipes, the fuel being unable to penetrate into the interior. For other embodiments, these components 21 and 22 may also be permeable to the fuel.

Figure 5:
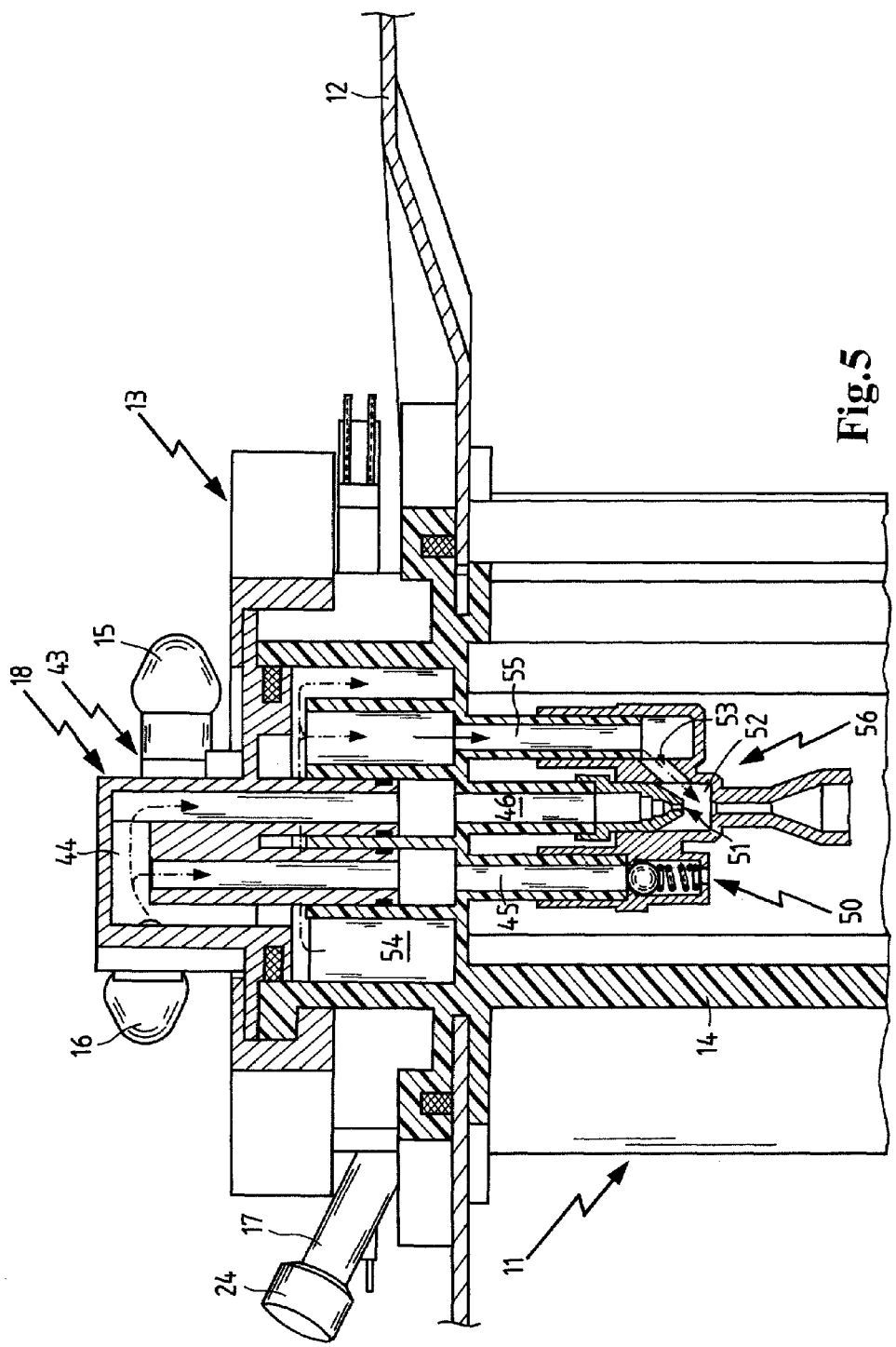
FIG. 5 is a sectional view of a sector of the fuel filter of FIG. 1.

FIG. 5 shows a sector from the fuel filter of FIG. 1 in a sectional view taken along the line X-X. Components corresponding to those in FIGS. 1 to 4 are identified by the same reference numerals. For this representation, a degassing unit 43 is shown in section. The degassing unit 43 is downstream from the pre-heater unit 18. The fuel entering the fuel filter 11 through the fuel return pipeline 16 reaches a distributor space 44, from where it can enter a tank return pipeline 45 and a conveying pipeline 46.

A valve 50, which is provided particularly for regulating the pressure in the conveying pipeline 46, is disposed in the tank return pipeline 45. The conveying pipeline 46 has a nozzle 51, through which a defined jet of fuel can pass. A mixing space 52, which is connected with the nozzle 51 as well as with a borehole 53, is disposed, in the flow direction, after the nozzle 51. The borehole 53 connects the mixing space 52 via an air pipeline 55 with the gas collection space 54.

An ejector pump 56, which aspirates gas from the air pipeline and the gas collection space 54 through the return pipeline from the conveying pipeline 46 and passes it into the fuel tank 10, is disposed downstream from the mixing space 52. The fuel filter is the thus degassed. Gas which collects in the fuel tank 10 is discharged through the venting system (not shown) of this tank 10 to the environment to the surroundings.

As shown especially in FIGS. 1 and 5, the pre-heating unit 18, the de-gassing device 43, the valve 50, the tank return pipeline 45 and the conveying pipeline 46 are positioned closely together to form a compact unit in an upper part of the module.

Figure 6:
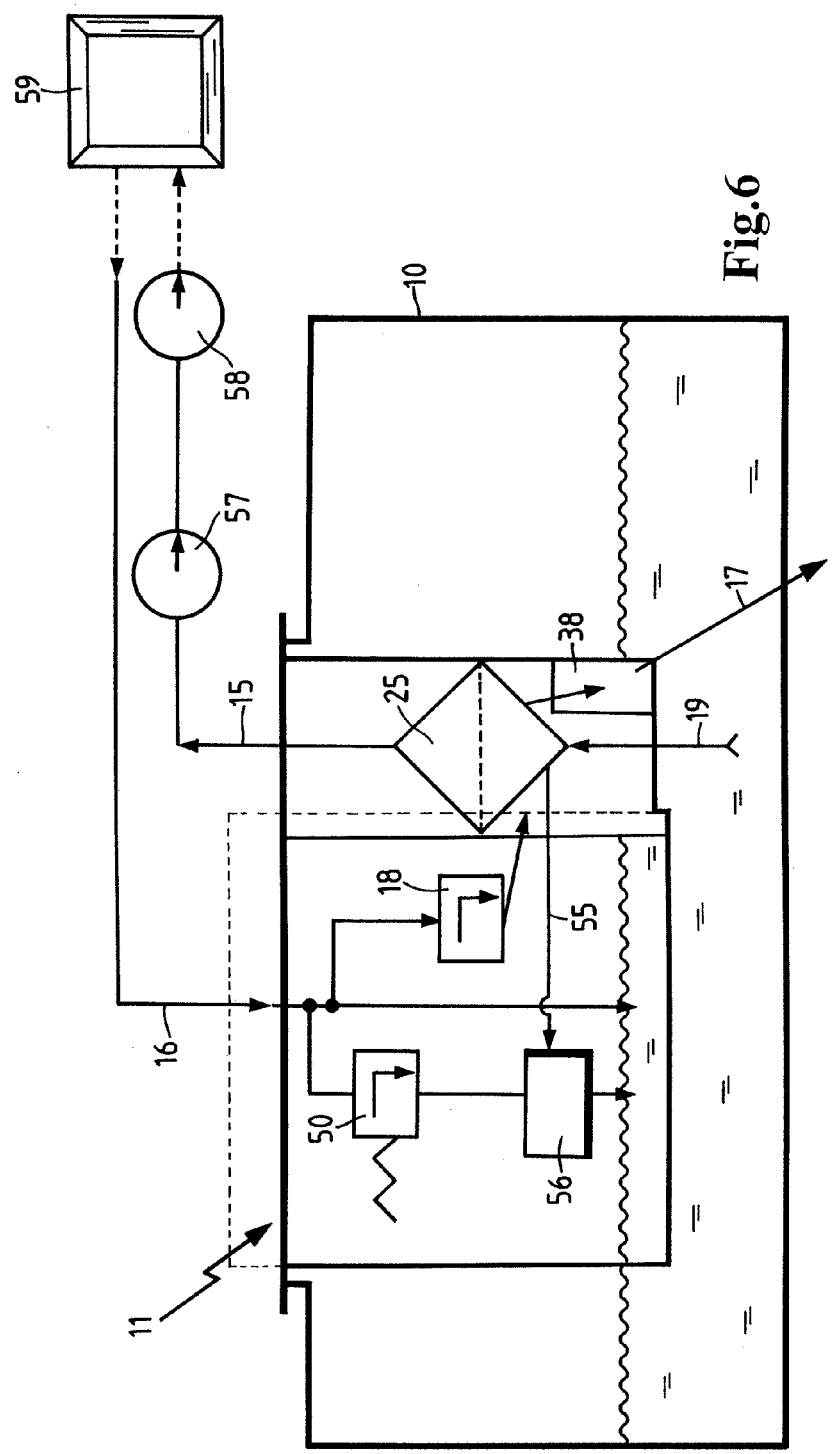
FIG. 6 is a diagrammatic representation of a fuel module according to the invention.

FIG. 6 shows a diagrammatic representation of the fuel module according to the invention. A fuel filter 11 is disposed in the fuel tank 10. For purposes of illustration, the relative proportions of the filter and tank to do not correspond to those likely to be used in actual practice. Naturally, the fuel tank may be constructed many times larger than the fuel filter 11. Components corresponding to those described in the previous Figures are indentified by the same reference numerals.

A fuel-supplying pump 57, which aspirates fuel via the fuel intake pipeline 19 from the fuel tank 10 into the fuel filter 11, adjoins the fuel outlet 15. The fuel is cleaned or filtered by the filter element 25. Since the fuel-supplying pump 57 sucks up the fuel, gas bubbles are formed in the fuel filter and collect in the gas collection space 54 (see FIG. 5) in the fuel filter 11. Since the filter element 25 separates water contained in the fuel, the water, which has a higher density than the fuel, collects in the water storage unit 38 of the fuel filter 11.

After the fuel-supplying pump 57, the purified fuel is brought by a high-pressure pump 58 to the required operating pressure of a subsequent auto-ignition engine 59. Any unconsumed fuel, supplied in excess, is provided as return flow to the fuel return pipeline 16. If necessary, especially when the fuel temperature is too low, the return flow over the pre-heater a unit 18 is used to pre-heat the fuel, so that the filter element 25 does not become blocked.

Furthermore, the return flow can be used to degas the fuel filter 11. For this purpose, the ejector pump 56 aspirates gas bubbles from the fuel filter 11, the required pressure relationships being set by the valve 50. The return flow, mixed with the gas bubbles, is then discharged to the fuel tank 10. In the event that the functions of fuel pre-heating and/or degassing are not required, the return flow can also be discharged directly to the fuel tank.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A fuel module comprising a fuel tank and a fuel filter, said fuel tank having a wall which encloses the volume of the fuel tank, said wall having an opening in the area of the fuel filter, and said fuel filter being sealed to the wall in the vicinity of said opening, wherein the fuel filter comprises a filter medium which separates water from fuel passed through said filter, and wherein the fuel filter further comprises a water storage unit disposed within the fuel filter for receiving water separated from the fuel, wherein the fuel filter includes a pre-heating unit for heating the fuel and a degassing device downstream from the pre-heating unit, the fuel entering the fuel filter through a fuel return pipeline reaches a distributor space from where it enters a tank return pipeline and a conveying pipeline, the conveying pipeline including a nozzle through which a defined jet of fuel passes, a valve, disposed in the tank return pipeline, is configured to regulate pressure in the conveying pipeline, a mixing space, connected to the nozzle and a borehole, is disposed after the nozzle in the flow direction, the borehole connecting the mixing space via an air pipeline with a gas collection space, and the pre-heating unit, the degassing device, the valve, and the tank return and conveying pipelines are configured as a compact unit in an upper part of the fuel module.

2. A fuel module according to claim 1, wherein the fuel filter is connected by a bayonet lock with the fuel tank, and a seal is disposed in the bayonet lock for sealing the connection.

3. A fuel module according to claim 1, further comprising a fuel sensor disposed in the fuel tank for detecting the degree to which the fuel tank is filled.

4. A fuel module according to claim 1, wherein the fuel filter is provided with a water sensor for detecting the degree to which the water storage unit is filled.

5. A fuel module according to claim 1, further comprising a water suction pipe connected at one end with the water storage unit and at a second end with a water outlet through which water can be discharged outside of the fuel tank.

6. A fuel module according to claim 1, further comprising a support for the fuel filter, said support being disposed in the fuel tank opposite the opening.

7. A fuel module according to claim 1, wherein said fuel tank is configured to contain diesel fuel.

* * * * *